United States Patent
Ma et al.

(10) Patent No.: US 7,844,971 B2
(45) Date of Patent: Nov. 30, 2010

(54) METHOD AND APPARATUS FOR DETECTING CROSS-THREAD STACK ACCESS IN MULTITHREADED PROGRAMS

(75) Inventors: Zhiqiang Ma, Champaign, IL (US); Paul Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1463 days.

(21) Appl. No.: 11/238,530

(22) Filed: Sep. 28, 2005

(65) Prior Publication Data

US 2007/0074213 A1 Mar. 29, 2007

(51) Int. Cl.
*G06F 9/46* (2006.01)
*G06F 13/00* (2006.01)

(52) U.S. Cl. .................. 718/104; 718/107; 718/100; 711/147

(58) Field of Classification Search .......... 711/118, 711/125; 710/244; 718/102, 100; 717/128
See application file for complete search history.

(56) References Cited

U.S. PATENT DOCUMENTS

| | | | | |
|---|---|---|---|---|
| 6,560,629 B1* | 5/2003 | Harris | ................. | 718/105 |
| 6,862,635 B1* | 3/2005 | Alverson et al. | ............ | 710/52 |
| 6,910,209 B2* | 6/2005 | Kawahara et al. | ........... | 718/102 |
| 6,934,741 B2* | 8/2005 | Shavit et al. | ................ | 709/214 |
| 7,321,965 B2* | 1/2008 | Kissell | ..................... | 712/229 |
| 7,380,039 B2* | 5/2008 | Miloushev et al. | .......... | 710/244 |
| 7,447,829 B2* | 11/2008 | Wilding et al. | ................. | 711/1 |
| 7,516,446 B2* | 4/2009 | Choi et al. | .................. | 717/128 |
| 2005/0262301 A1* | 11/2005 | Jacobson et al. | ........... | 711/118 |
| 2009/0193417 A1* | 7/2009 | Kahlon | ...................... | 718/100 |

* cited by examiner

*Primary Examiner*—Chat C Do
*Assistant Examiner*—Tammy Lee
(74) *Attorney, Agent, or Firm*—Blakely, Sokoloff, Taylor & Zafman LLP

(57) ABSTRACT

A threaded-programming analysis and diagnostic tool including two data structures to store a termination status of each of the threads in a multi-threaded program, logic to propagate information between the two data structures, and detection logic to determine whether a first thread could access the stack of a second thread before the second thread terminates.

15 Claims, 4 Drawing Sheets

METHOD AND APPARATUS FOR DETECTING CROSS-THREAD STACK ACCESS IN MULTITHREADED PROGRAMS

FIELD OF THE INVENTION

The invention relates to analysis of threaded program execution. More specifically, the invention relates to detecting a class of actual or potential memory accesses in the context of a multi-threaded execution environment.

BACKGROUND

Threaded programming environments, where several independent sequences of instructions execute concurrently within a shared memory space, provide a powerful paradigm for addressing several types of computational problems and for using multiprocessor systems efficiently. However, the shared memory space also makes possible a type of programming error that does not affect single-threaded programs that execute in a private, virtual memory space. Since threads can access (and modify) each other's memory, software developers must use great caution when passing values between threads by reference, lest such references inadvertently be used by a thread after the original variable or memory structure has become invalid.

As a concrete example, consider a first thread executing a subroutine that uses a local variable. The local variable will probably reside in a portion of memory dedicated to the first thread's stack. The first thread may provide the address of the local variable to a second thread so that the second thread can examine or modify the variable. However, if the first thread exits the subroutine, the local variable will go out of scope and the memory it occupied on the first thread's stack will likely be re-used for a different subroutine's stack frame. If the second thread now accesses the memory that previously held the local variable, it will probably obtain unexpected or incorrectly-formatted data; if it modifies the memory, it will probably cause incorrect or erratic operation of the first thread.

Although it is possible for correctly-designed threaded programs to access memory of one thread's stack from a different thread, the challenges of ensuring the validity of such cross-thread stack access (particularly in a large, complex program) may outweigh any advantages of doing so. For this reason, some software design rules prohibit cross-thread access, while others call for identification and careful review of any accesses.

Threaded programming environments have another characteristic that can complicate the development and debugging of multi-threaded programs. Threaded systems commonly lack an implicit thread synchronization mechanism: thread execution may proceed piecemeal on a timesliced basis, or threads may execute simultaneously on multiple processors of a multi-processor system. The precise order and temporal relationship between thread operations may vary from run to run and from system to system. Any synchronization that is logically required by the program must be explicitly coded using primitives such as mutexes, events, and semaphores, but except for these points of synchronization, there is often no guarantee that one operation will happen before or after another. The indeterminate temporal relationship between some thread operations makes analysis of thread memory use difficult. A method of determining whether certain operations will always occur after other operations may serve as the basis of a useful analytical tool for software developers.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention monitor the creation, termination, and synchronization operations of a plurality of threads in a multi-threaded program, and use information gathered during such monitoring to determine whether a cross-thread stack access ("CTSA") occurs or may potentially occur during the lifetime of the accessed thread. Embodiments work generally by modeling the flow of information about thread lifetime from one thread to another, from a thread to a synchronization primitive, and from a synchronization primitive to a thread. Then, if a thread accesses a memory location known to belong to the stack of a different thread, the model can be examined to determine whether the accessed stack's thread had terminated, and whether the knowledge of that termination had propagated to the accessing thread.

Figure 1:
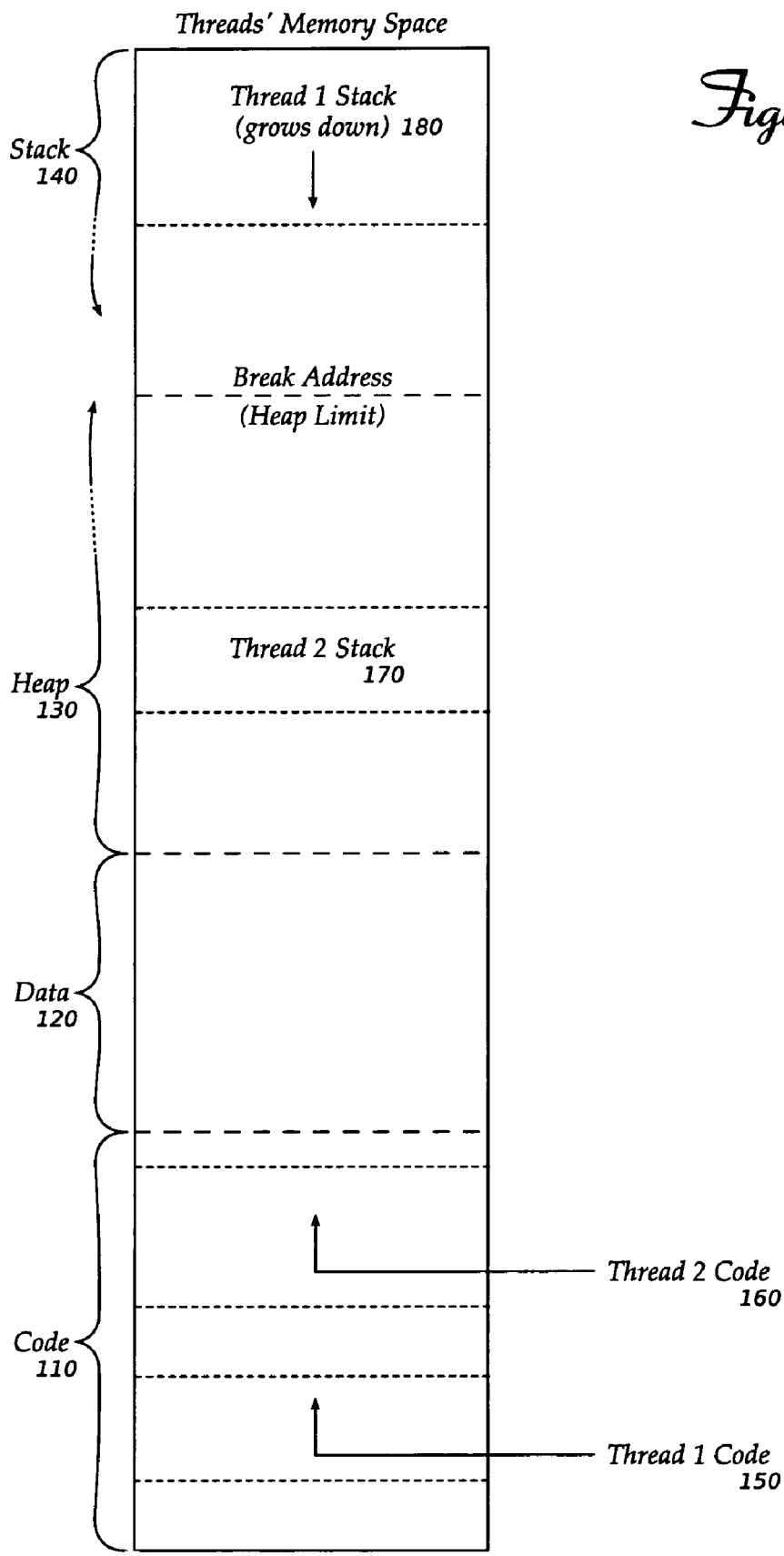
FIG. 1 shows a memory space of a typical threaded execution environment.

FIG. 1 shows a memory space representative of the spaces provided by typical threaded execution environments. All of the related threads operate within the same memory space, and all can access any portion of the space. The layout of a memory space may be as shown: executable instructions ("code") are placed in a first portion of memory 110. Pre-initialized data ("data") may follow in a second portion of memory 120. Uninitialized data (the "heap") 130 may follow the initialized data, extending upwards in memory to a break address, while the stack space may grow downwards from a higher address towards the heap limit. Alternatively, stack space for threads may be allocated at locations within the heap (for example, Thread 2 Stack shown as element 170).

When a new thread is created, it is typically provided with a stack and an address to indicate the start of an instruction sequence to be executed. FIG. 1 shows two threads' code sequences (150, 160) and stack regions (170, 180). Several threads may execute the same (or overlapping) code sequences, but each thread is provided with its own stack.

Although not shown in FIG. 1, some regions of the memory space may be reserved for the operating system or other uses.

Figure 2:
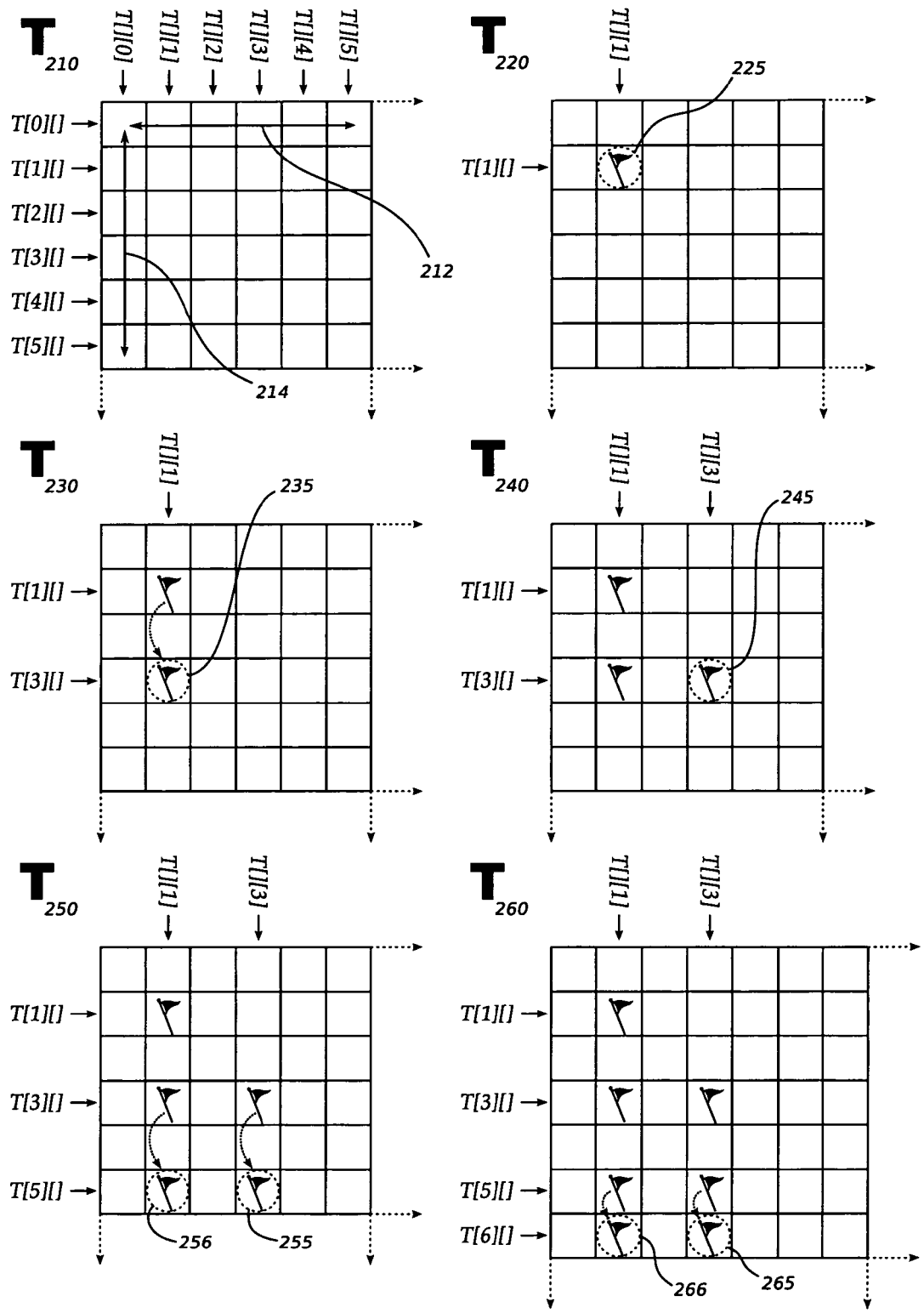
FIG. 2 is a graphical representation of a first data structure used by embodiments of the invention.

FIG. 2 shows a logical representation of the first of two data structures used in embodiments of the invention. Thread data structure 210 ("T") is a square array of Boolean flags; each row 212 and column 214 corresponds to a thread that is active or was previously active but has terminated. The rows and columns are numbered sequentially from zero, and the following discussion will proceed on the assumption that each thread can be uniquely identified by a small integer. However, actual multithreaded environments may use some other token to identify threads. Techniques for efficiently maintaining the data structures when thread identifiers are not small sequential integers will be mentioned below.

Thread data structure 210 stores, for each of a plurality of threads, a termination status of every thread. That is, each cell in thread data structure 210 indicates whether the thread associated with the cell's row is aware of the termination of the thread associated with the cell's column, so the entire data structure represents knowledge of each of a plurality of threads regarding the termination of every other thread of the plurality.

Initially, the data structure is empty, indicating that no threads have terminated. Eventually, a thread will finish, and an embodiment of the invention will set a first flag 225, as shown in updated thread data structure 220. Here, flag 225 is associated with thread 1; the flag at T[1][1] shows that thread 1 is "aware of" its own termination.

A second thread (in this example, thread 3) can detect the termination of a first thread by executing a synchronization primitive commonly called "join." The primitive typically suspends the calling thread's execution until the joined thread exits. After a thread joins another thread, an embodiment of the invention updates the thread data structure to indicate that the joining thread knows of the joined thread's termination. This is shown by flag 235 in updated thread data structure 230.

Later, thread 3 may itself terminate and an embodiment of the invention will update the data structure with flag 245 as shown in updated thread data structure 240.

If thread 5 joins thread 3, an embodiment of the invention will set flag 255 as shown in updated thread data structure 250, but it will also set flags for any threads thread 3 knew to have terminated. In this example, thread 3 had earlier joined thread 1, so the embodiment will also set flag 256.

In a similar vein, if a thread creates a new thread, the row corresponding to the new thread will be initialized to the current values of the row corresponding to the creating thread. Thus, if thread 5 creates thread 6, then the row corresponding to thread 6 will have flags 265 and 266, as shown in updated thread data structure 260. Note that updated thread data structure 260 has one more row and column than the previous structures shown. The extra row and column correspond to the newly-created thread, thread 6. Practical difficulties presented by a data structure that grows in two dimensions, and a workable solution is presented.

The operations of an embodiment of the invention discussed with reference to FIG. 2 may be described more precisely in this way: when a thread terminates, the embodiment updates the thread data structure by setting the flag at the row and column of the terminating thread. In other words:

T[terminating-thread][terminating-thread]=TRUE (Eq. 1)

When a thread joins another thread, the embodiment updates the thread data structure by performing a logical OR of the flags of the row of the joined thread with the flags of the row of the joining thread, storing the resulting flags back into the row of the joining thread. Or, more succinctly:

T[joining-thread][] |=T[joined-thread][] (Eq. 2)

where "|=" indicates logical OR and assignment, and the empty brackets indicate that the operation is repeated for corresponding columns in the specified rows.

Also, when a thread creates a new thread, the new thread's row is initialized thus:

T[new-thread][]=T[creating-thread][] (Eq. 3)

Figure 3:
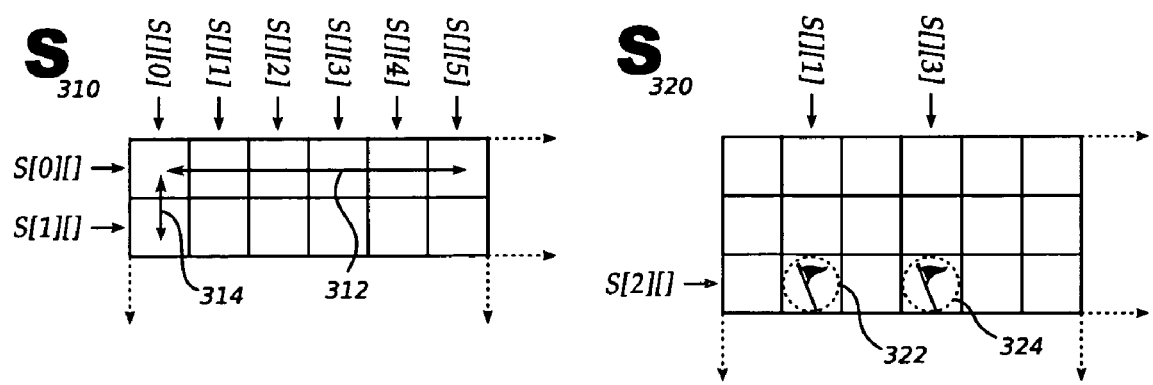
FIG. 3 is a graphical representation of a second data structure used by embodiments of the invention.

The foregoing description explains one way in which information about the termination of one thread can be propagated to another thread. FIG. 3 shows a second data structure that supports a second way of propagating this information.

Synchronization primitive array ("S") 310 is a rectangular array of Boolean flags; each row 312 corresponds to one synchronization primitive, while each column 314 corresponds to a thread that is active, or was previously active but has now terminated. The width of S is equal to the number of active and terminated threads, and consequently also equal to the width of the thread data structure T shown in FIG. 2. The same small integers used above to identify threads are used here; similarly, synchronization primitives are identified by small, sequential integers starting with zero. S stores, for each of a plurality of synchronization primitives, a termination status of every thread. A Boolean flag in synchronization primitive array S indicates that the synchronization primitive carries information about the termination of a thread.

Synchronization primitives (also called "synchronization objects" in some programming environments) such as mutexes, events, and semaphores have varying semantics, but each has two basic functions that are used by embodiments of the invention. Each primitive can be signaled by a thread that wishes to communicate the occurrence of some event or condition to one or more other threads, and each primitive can be waited on by one or more threads that wish to detect the occurrence of the event or condition. For example, a program may use a semaphore to indicate that new work has arrived. A receiver thread may collect data over a network from clients of the program, and when a complete request from a client has been received and validated, the receiver thread may place the request on a "to-do" queue and signal the semaphore. One or more worker threads may have waited on the semaphore, so when the receiver thread signals, one of the workers will wake up, remove the request from the to-do queue, and process it.

Embodiments of the invention are not concerned with the meaning assigned to a synchronization primitive by the application program. Instead, threads' signaling and waiting behavior is used to drive the propagation of thread termination information between the thread data structure and synchronization primitive array.

Three events in the lifecycle of a synchronization primitive are of use to embodiments of the invention. First, when a thread creates a new synchronization primitive, the primitive acquires whatever thread termination information the creating thread had. For example, if thread 5 (above) created synchronization primitive 2, the primitive's existence would imply that threads 2 and 3 had terminated. This is shown by flags 322 and 324 in updated synchronization primitive array 320. Or, in more succinct notation:

S[new-primitive][]=T[creating-thread][] (Eq. 4)

Second, when a thread signals, or "posts," to a synchronization primitive, that primitive acquires whatever thread termination information the signaling thread had, in addition to whatever termination information the primitive already encoded:

S[primitive][]|=T[posting-thread][] (Eq. 5)

Finally, when a thread waits on a synchronization primitive, or "receives from" the primitive, the thread receives all thread termination information encoded in the primitive when the waiting function completes:

T[receiving-thread][]|=S[primitive][] (Eq. 6)

Equations 1-6 show how information about thread termination propagates from thread to thread, from thread to synchronization primitive, and from synchronization primitive to thread. Embodiments of the invention take advantage of synchronization operations performed by the application itself to move information among the data structures. Since the information moves only at points where the thread operations are guaranteed to be synchronized, it accurately reflects the knowledge of each thread regardless of the precise temporal relationships between thread operations at points other than the synchronization points. In other words, any operations of thread i are guaranteed to happen after thread j terminates if T[i][j] is TRUE.

Figure 4:
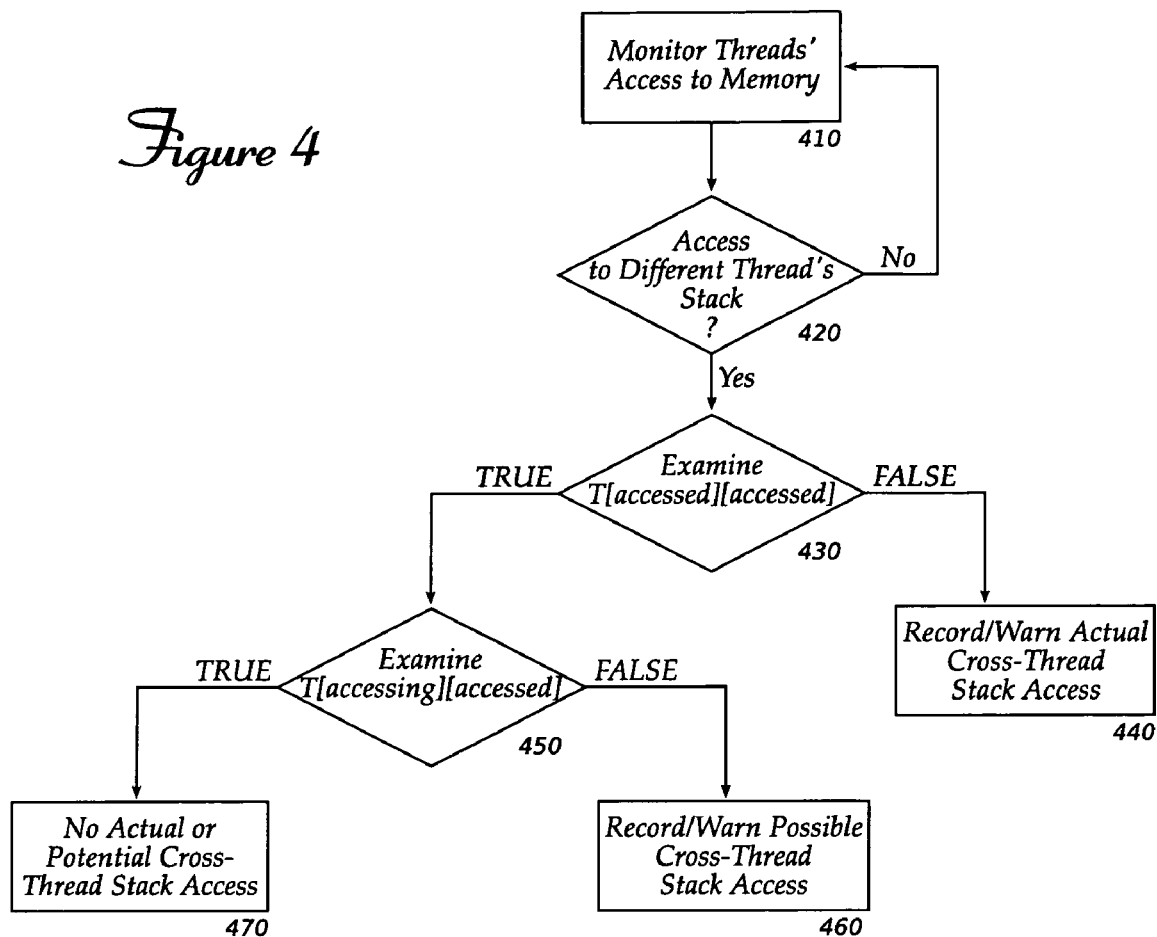
FIG. 4 is a flow chart showing operations performed according to an embodiment of the invention.

The information in thread data structure T can be used by embodiments of the invention according to the flow chart of FIG. 4. An embodiment may track the creation of each thread and record the extent (start and end addresses) of the thread's stack in an array or similar data structure. Then, as the various threads execute, the embodiment monitors all accesses to memory (410). If a thread accesses a memory location recorded in the thread stack ranges array as belonging to a different thread (420), the thread data structure entry for the accessed thread (T[accessed][accessed]) is examined (430). If that entry is FALSE, it indicates that the accessed thread is still executing and so the accessing thread has actually performed a cross-thread stack access. Embodiments of the invention may record and/or warn of the actual cross-thread stack access (440).

If T[accessed][accessed] is TRUE, then the accessed thread has terminated, so the cross-thread stack access will not cause any harm to the accessed thread (although any data found at the accessed address may be invalid, and may cause improper operation of the accessing thread). Next, an embodiment will examine T[accessing][accessed] (450). If that data structure entry is FALSE, then the accessing thread is not certain to perform the cross-thread stack access after the accessed thread has terminated. Under a different thread scheduling algorithm, system load, or processor configuration, the access might occur while the accessed thread is still active. In this case, an embodiment of the invention should record and/or warn of a potential cross-thread stack access (460).

If T[accessed][accessed] is TRUE and T[accessing][accessed] is TRUE, then the memory access is neither an actual nor a potential cross-thread stack access (although it may still represent a programming error). One legitimate way such a memory access might occur is if the accessed (terminated) thread's stack was returned to the pool of free memory, and was subsequently re-allocated for some other purpose.

The preceding description of the T and S data structures presumed that the data structures were implemented as arrays of Boolean flags. It is easy to understand the flow of information in such an implementation, but because both arrays must grow in width to accommodate additional threads, as well as in height to accommodate additional threads (for the T array) or synchronization objects (for the S array), the overhead of maintaining the arrays may be considerable. A more practical implementation might associate a bit (or Boolean) vector with each thread and synchronization object. The number of elements of each vector would be at least as large as the number of threads, and the vectors could more easily be extended as new threads were created. This implementation would essentially split the T and S arrays into individual rows, and associate each row with a thread (for rows of the T array) or a synchronization object (for rows of the S array). However, neither the information contained in the vectors nor its propagation would be affected by this organization of the data structures.

Instead of bit or Boolean vectors, an embodiment of the invention may maintain vectors of more complex data structures that contain, for example, other useful information about each thread. For detecting actual and potential cross-thread stack access, all that is necessary is that the data structure contain (either explicitly or implicitly) enough information to determine whether a first thread is certain to be aware of the termination of a second thread. This is a "yes/no" or "true/false" determination, and so the necessary functionality can most clearly be described as "Boolean." For the purposes of this description, an array, vector or other data structure of Boolean values is explicitly defined to include an array, vector or other data structure of arbitrary values from which the stated true/false determination can be made.

Other embodiments of the invention may use different data structures to manage the information that represents knowledge of one thread about the termination of another thread. Selection of an appropriate data structure to manage this information according to the facilities available in the programming environment is within the capabilities of one of ordinary skill in the art.

The preceding descriptions also presumed that threads and synchronization objects could be uniquely identified by small, sequential integers, which were used as indices for the T and S arrays. Some threaded environments use opaque, multi-bit identifiers (for example, 16 bit, 32 bit or 64 bit identifiers) for these entities, so it may be impractical to use the identifiers directly as indices of arrays or vectors. Instead, the identifiers may serve as keys to an associative array or hash of the elements of an array row or vector. Other threaded environments may distinguish between threads simply based on the value of a stack pointer, because each thread has its own stack and can be uniquely identified by the area of memory containing the address pointed to by the stack pointer. The use of identifiers of any of these alternate methods of identifying threads and synchronization objects to select a cell within an array or an element within a vector or other data structure is within the capabilities of one of ordinary skill in the art.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that actual and potential cross-thread stack accesses can also be detected by software and hardware that distribute the functions of embodiments of this invention differently than herein described. Such variations and implementations are understood to be encompassed by the following claims.

We claim:

1. A data manipulation system in a computing device, the data manipulation system comprising:

a processor;
a memory having instructions which, when executed by the processor, cause the processor to,
generate a first data structure ("T") in the memory, the first data structure to include, for each of a plurality of threads, a termination status of the each of a plurality of threads;
generate a second data structure ("S") in the memory, the second data structure to include, for each of a plurality of synchronization primitives, the termination status of a plurality of threads that is associated with a synchronization primitive;
execute a propagation logic to propagate the termination status, of a first thread and a second thread, between the first data structure and the second data structure in response to thread operations; and
execute a detection logic to determine, based on the termination status of the first thread and the second thread contained in the first data structure and the second data structure, whether the first thread could access a stack allocated in the memory and designated to the second thread before a termination of the second thread, the detection logic having
an actual-access reporting logic to report an actual cross-thread stack access if the second thread has not terminated, and
a potential-access reporting logic to report a potential cross-thread stack access if the second thread has terminated and the termination status of the second thread has not propagated to the first thread.

2. The data manipulation system of claim 1, further comprising:
a third data structure to record a start address and an end address of the stack designated to the second thread.

3. The data manipulation system of claim 1 wherein the first data structure comprises:
a Boolean vector for each of the plurality of threads, the Boolean vector to contain at least one Boolean value for each of the plurality of threads, the Boolean value indicating the termination status of a thread.

4. The data manipulation system of claim 1 wherein the second data structure comprises:
a Boolean vector for each of the plurality of synchronization primitives, the Boolean vector to contain at least one Boolean value for each of the plurality of threads, the Boolean value indicating the termination status of a thread.

5. The data manipulation system of claim 1 wherein the propagation logic is to perform at least one of:
$T[i][i]$=TRUE if thread i terminates;
$T[j][\ ]$=$T[i][\ ]$ if thread i creates thread j;
$T[j][\ ]$ |=$T[i][\ ]$ if thread j joins thread i;
$S[k][\ ]$=$T[i][\ ]$ if thread i creates thread synchronization object k;
$S[k][\ ]$ |=$T[i][\ ]$ if thread i posts to thread synchronization object k; or
$T[i][\ ]$ |=$S[k][\ ]$ if thread i receives from thread synchronization object k; wherein
i and j are thread identifiers, k is a synchronization primitive identifier, mathematical symbol "=" indicates an assignment operation, and mathematical symbol "|=" indicates a logical OR operation.

6. The data manipulation system of claim 1 wherein the detection logic is to detect a memory access by a first thread ("i") to a location within a stack designated to a second thread ("j"), wherein the the actual-access reporting logic to report an actual cross-thread stack access comprises the actual-access reporting logic to report the actual cross-thread stack access if $T[j][j]$ is FALSE; and
wherein the potential-access reporting logic to report a potential cross-thread stack access comprises the potential-access reporting logic to report the potential cross-thread stack access if $T[i][j]$ is FALSE and $T[j][j]$ is TRUE.

7. The data manipulation system of claim 1, wherein the each of the plurality of synchronization primitives comprises a synchronization primitive selected from the group consisting of a mutex, a semaphore, and an event.

8. A method of analyzing thread activity comprising:
Recording, by a processor, a termination status of a first thread in a first data structure if the first thread terminates, the first data structure having, for each of a plurality of threads, the termination status of the each of the plurality of threads;
propagating, by the processor, the termination status of the first thread to a second thread if the second thread joins the terminated first thread;
propagating, by the processor, the termination status from the second thread to a synchronization primitive by updating a second data structure if the second thread posts to the synchronization primitive, the second data structure having, for each of a plurality of synchronization primitives, the termination status of the plurality of threads that is associated with the synchronization primitive;
propagating, by the processor, the termination status from the synchronization primitive to a third thread if the third thread receives from the synchronization primitive; and
examining, by the processor, the termination status if the third thread accesses a stack of a fourth thread, different from the third thread, wherein examining the termination status includes
warning of an actual cross-thread stack access if the fourth thread has not terminated, and
warning of a potential cross-thread stack access if the fourth thread has terminated and the termination status of the fourth thread has not propagated to the third thread.

9. The method of claim 8 wherein recording comprises setting a Boolean flag in the first data structure.

10. The method of claim 9 wherein setting the Boolean flag comprises storing data from which a true/false value indicating the termination status can be derived from the first data structure.

11. The method of claim 8 wherein propagating the termination status to the second thread comprises performing a logical OR between a first plurality of Boolean flags in the first data structure and a second plurality of Boolean flags in the first data structure, the first plurality of Boolean flags representing the termination status of threads corresponding to the first thread in the first data structure, the second plurality of Boolean flags representing the termination status of threads corresponding to the second thread in the first data structure.

12. The method of claim 8 wherein propagating the termination status to the synchronization primitive comprises performing a logical OR between a first plurality of Boolean flags in the first data structure and a second plurality of Boolean flags in the second data structure.

13. A non-transitory machine-readable storage medium containing instructions that, when executed by a processor, cause the processor to perform operations comprising:
initializing a first data structure ("T") to store a termination status of a thread that is available to a first thread, the first data structure having, for each of a plurality of threads, the termination status of the each of the plurality of threads;

initializing a second data structure ("S") to store the termination status that is contained by a synchronization primitive, the second data structure having, for each of a plurality of synchronization primitives, the termination status of the plurality of threads that is associated with the synchronization primitive;

propagating the termination status between the first data structure and the second data structure in response to actions of the first thread;

monitoring a memory access of the first thread to detect an access to a stack of a second thread; and examining the first data structure and the second data structure to determine, based on the termination status of the second thread, whether the access could occur before a termination of the second thread, the examining including producing a warning if the first thread accesses the stack of the second thread, the warning to notify a user of an actual cross-thread stack access if the second thread has not terminated, and the warning to notify a user of a potential cross-thread stack access if the second thread has terminated and the first data structure does not contain information about a termination of the second thread.

14. The machine-readable storage medium of claim 13 wherein initializing the first data structure comprises copying a data structure of a creating thread that creates the first thread.

15. The machine-readable storage medium of claim 13 wherein initializing the second data structure comprises copying a data structure of a creating thread that creates the synchronization primitive.

* * * * *